US012444400B2

(12) United States Patent
Wu et al.

(10) Patent No.: US 12,444,400 B2
(45) Date of Patent: Oct. 14, 2025

(54) SYSTEMS AND METHODS FOR ADAPTIVE ADDITIVE SOUND

(71) Applicant: Google LLC, Mountain View, CA (US)

(72) Inventors: Christine Jean Wu, San Francisco, CA (US); Shokofeh Darbari, Palo Alto, CA (US); Shane Anton Myrbeck, Los Angeles, CA (US); Caitlin Emily Riggs, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 167 days.

(21) Appl. No.: 18/091,699

(22) Filed: Dec. 30, 2022

(65) Prior Publication Data

US 2024/0221717 A1 Jul. 4, 2024

(51) Int. Cl.
*G10K 11/178* (2006.01)

(52) U.S. Cl.
CPC .. *G10K 11/17881* (2018.01); *G10K 11/17885* (2018.01)

(58) Field of Classification Search
CPC ....... G10K 11/17881; G10K 11/17885; G10K 15/08; G10K 11/1754; H04K 3/68; H04K 3/84; H04K 2203/34; H04K 3/42; H04K 3/43; H04K 3/46; H04K 2203/12; H04K 3/825; H04K 3/45; H04R 27/00; H04S 7/302; H04S 7/307; H04S 2400/13; G10L 21/16
USPC ........................................................ 381/71.8
See application file for complete search history.

(56) References Cited

U.S. PATENT DOCUMENTS 10,726,855 B2 7/2020 Krasnov
2009/0216526 A1* 8/2009 Schmidt .............. G10L 21/0208 704/226
2015/0055790 A1* 2/2015 Kawakami ....... G10K 11/17861 381/73.1
2018/0268834 A1* 9/2018 Krasnov ................. G10L 25/48
2019/0206381 A1* 7/2019 Carter ................ G10K 11/1754

FOREIGN PATENT DOCUMENTS

WO WO-2018170045 A1 * 9/2018 ........... G10K 11/175

OTHER PUBLICATIONS

International Search Report and Written Opinion for Application No. PCT/US2023/086382, mailed Apr. 19, 2024, 11 pages.
International Preliminary Report on Patentability for Application No. PCT/US2023/086382, mailed Jul. 10, 2025, 7 pages.

* cited by examiner

*Primary Examiner* — Carolyn R Edwards
*Assistant Examiner* — Friedrich Fahnert
(74) *Attorney, Agent, or Firm* — DORITY & MANNING P.A.

(57) ABSTRACT

A method for adaptive additive sound includes receiving ambient sound data corresponding to ambient sound in a first zone acquired by a microphone in the first zone, analyzing the ambient sound data from the first zone, generating audio signal data for the second zone based at least in part on the ambient sound data from the first zone, and transmitting the audio signal data for the second zone to a speaker in the second zone. The first zone is separate from the second zone within a space.

18 Claims, 2 Drawing Sheets

SYSTEMS AND METHODS FOR ADAPTIVE ADDITIVE SOUND

FIELD

The present disclosure relates generally to systems and methods for adaptive additive sound, e.g., in shared workspaces.

BACKGROUND

Modern workspaces frequently include open floorplans with numerous desks disposed within shared spaces. In some open floorplans, low partitions are provided between adjacent desks. In other open floorplans, no partitions are provided between adjacent desks. Thus, privacy between adjacent workspaces can be limited, which can reduce productivity in some situations.

Shared workspaces can also be noisy working environments. For example, talking coworkers, nearby printers, and other noise sources can accumulate to increase the ambient noise level in the shared workspaces. Certain workers in shared workspaces can find the ambient noise level inherent in such arrangements distracting. Thus, noisy shared workspaces can be difficult for some workers and limit productivity.

Known methods for "sound masking" can provide constant, predictable background sound, and a single static sound can be played to mask other noise sources. Such static sound masking has drawbacks. For example, listener fatigue can set in after hearing the static sound for long time periods, and the static sound may be noticed by the listener as a foreign sound, which can also be distracting.

A workspace with features for reducing or masking ambient noise would be useful.

SUMMARY

Aspects and advantages of embodiments of the present disclosure will be set forth in part in the following description, or may be learned from the description, or may be learned through practice of the embodiments.

Aspects of the present disclosure are directed to a method for adaptive additive sound. The method includes receiving ambient sound data corresponding to ambient sound in a first zone acquired by a microphone in the first zone, analyzing the ambient sound data from the first zone, generating audio signal data for the second zone based at least in part on the ambient sound data from the first zone, and transmitting the audio signal data for the second zone to a speaker in the second zone. The first zone is separate from the second zone within a space.

Aspects of the present disclosure are also directed to a system for adaptive additive sound. The system includes a first plurality of microphones distributed within a first zone. A first speaker is also positioned within the first zone. A second plurality of microphones is distributed within a second zone that is spaced from the first zone. A second speaker is also positioned within the second zone. The system also includes one or more processors and one or more non-transitory computer-readable media that store instructions that, when executed by the one or more processors, cause the computing system to perform operations. The operations include receiving ambient sound data corresponding to ambient sound in the first zone from the first plurality of microphones, analyzing the ambient sound data from the first zone, generating audio signal data for the second zone based at least in part on the ambient sound data from the first zone, and transmitting the audio signal data for the second zone to the second speaker.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures.

DETAILED DESCRIPTION

Figure 1:
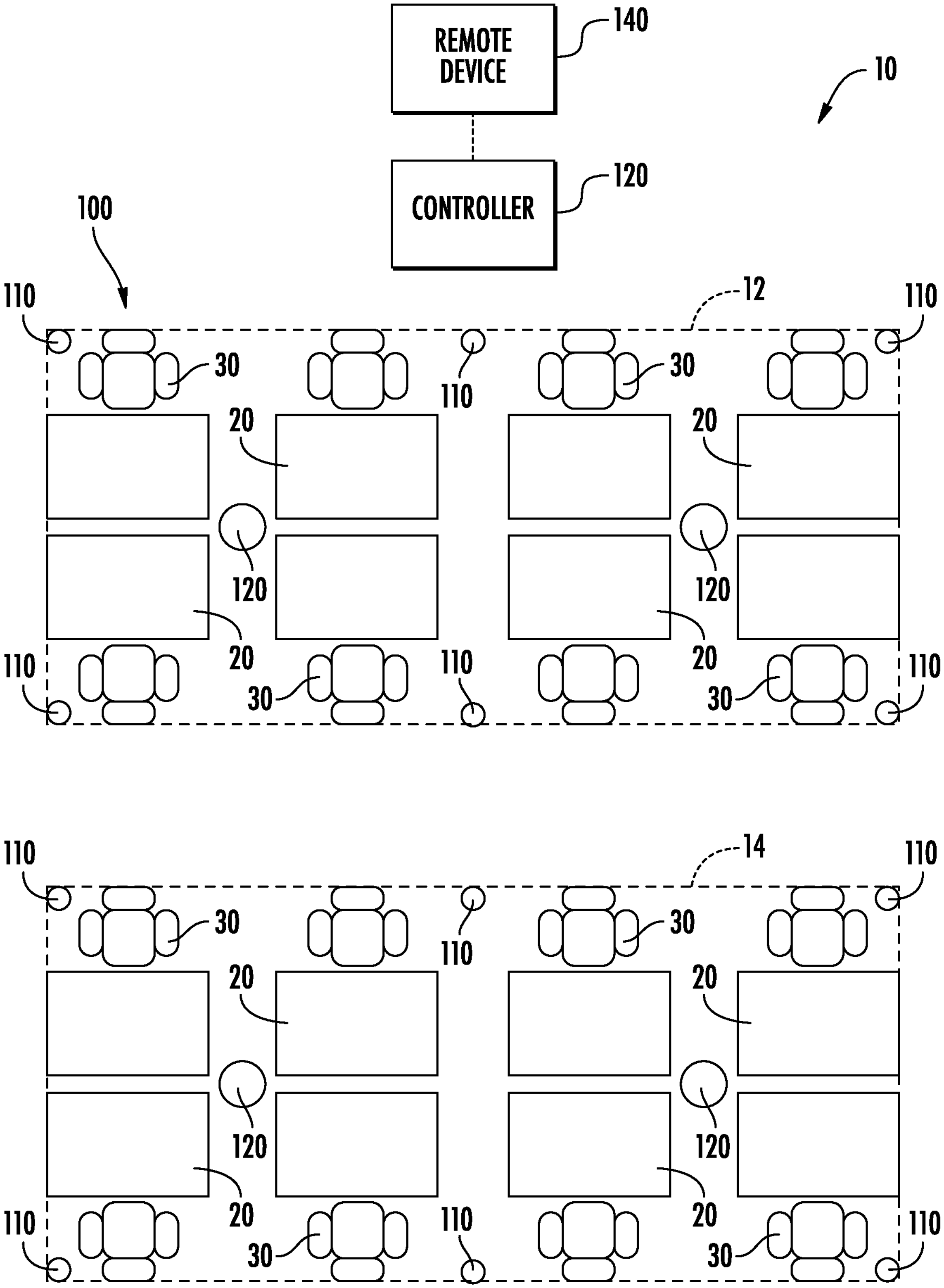
FIG. 1 is a top plan view of a workspace and a system for adaptive additive sound according to an example embodiment of the present subject matter.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Generally, the present disclosure is directed to systems and methods for adaptive additive sound. Using the systems and methods according to example aspects of the present subject matter can assist with dynamically adjusting additive zone sound levels, e.g., based on ambient noise in each zone. The systems and methods may receive data corresponding to ambient sound generated in each zone, analyze the ambient sound data relative to threshold sound levels, and inject composite sounds into the zones. The composite sounds may be a combination of ambient sounds from the zones with a recording of natural sounds, such as the sound of water, and masking noise. The systems and methods may thus create a background noise that is both lively for encouraging collaboration and steady state for masking.

FIG. 1 is a top plan view of a workspace 10 and a system 100 for adaptive additive sound according to an example embodiment of the present subject matter. As shown in FIG. 1, workspace 10 may include a plurality of desks 20 and a plurality of chairs 30, at which workers may conduct various tasks. Desks 20 may be suitable desks, such as standing desks and/or sitting desks, and chairs 30 may be suitable chairs, such as rolling office chairs and/or stools.

Desks 20 and chairs 30 may be distributed within workspace 10. For instance, in FIG. 1, a first zone 12 within workspace 10 may include a first subset of desks 20 and chairs 30, and a second zone 14 within workspace 10 may include a second subset of desks 20 and chairs 30. The desks 20 and chairs 30 within first zone 12 may be arranged in rows and/or columns, and the desks 20 and chairs 30 within second zone 14 may also be arranged in rows and/or columns. In the example embodiment shown in FIG. 1, desks 20 include sixteen (16) desks 20, and chairs 30 include sixteen (16) chairs 30, with eight (8) desks 20 and chairs 30 in each of first and second zones 12, 14. In example embodiments, first and second zones 12, 14 may each include no less than four (4) desks 20 and chairs 30 and no greater than fifty (50) desks 20 and chairs 30. It will be understood that the arrangement and number of desks 20 and chairs 30 shown in FIG. 1 is provided by way of example only and that the present subject matter may be used in or with other suitable arrangement and number of desks 20 and chairs 30 in alternative example embodiments. It will also be understood that desks 20 and chairs 30 may be distributed in more zones than first and second zones 12, 14 in workspace 10. For example, workspace 10 may be divided in to three, four, five, or more zones in alternative example embodiments, and each of the zones may include respective arrangements and numbers of desks 20 and chairs 30. The other zones within workspace may be arranged in the same or similar manner to that described below for first and second zones 12, 14.

Sizing of first and second zones 12, 14 may be varied. For instance, in example embodiments, each of first and second zones 12, 14 may be no less than fifty square meters (50 $m^2$) and no greater than five hundred square meters (500 $m^2$), such as about two hundred and seventy-five square meters (275 $m^2$). Moreover, first and second zones 12, 14 may be laid out in an “open office” floor plan for desks 20 and chairs 30 with various floorings, such as carpet, concrete, etc. The desks 20 and chairs 30 may also be laid out with the assumption that workers are desks 20 and chairs 30 in first and second zones 12, 14 may frequently conduct calls, such as telephone calls or video calls.

First zone 12 may be separated from second zone 14 in workspace 10. For example, first and second zones 12, 14 may correspond to discrete acoustic areas within workspace 10. Thus, e.g., users sitting at desks 20 and chairs 30 in first zone 12 may contribute significantly to the background or ambient noise at first zone 12, and, conversely, users sitting at desks 20 and chairs 30 in second zone 14 may not contribute significantly to the background or ambient noise at first zone 12 due to the spacing between first and second zones 12, 14. On the other hand, users sitting at desks 20 and chairs 30 in second zone 14 may contribute significantly to the background or ambient noise at second zone 14, and, conversely, users sitting at desks 20 and chairs 30 in first zone 12 may not contribute significantly to the background or ambient noise at second zone 14 due to the spacing between first and second zones 12, 14. As may be seen from the above, the spacing between first and second zones 12, 14 may limit the ambient sound travel between first and second zones 12, 14; however, it will be understood that ambient sound may travel between first and second zones 12, 14, e.g., due to the “open office” floor plan of workspace 10. As an example, first and second zones 12, 14 may be spaced apart by no less than one meter (1 m) and no greater than thirty meters (30 m) within workspace 10 in certain example embodiments. Such spacing between first and second zones 12, 14 may advantageously allow microphones within each of first and second zones 12, 14 to detect ambient noise in the other of first and second zones 12, 14, e.g., as the ambient noise level within the other of first and second zones 12, 14 rises. In example embodiments, first and second zones 12, 14 may be positioned adjacent each other, e.g., such without substantial partitions (such as floor-to-ceiling walls) or without any partitions between first and second zones 12, 14.

User productivity within workspace 10 may be significantly affected by ambient noise. Thus, as discussed in greater detail below, system 100 may be configured for adaptive additive sound, e.g., in order to reduce or mask the ambient noise within workspace 10. As shown in FIG. 1, system 100 may include a plurality of microphones 110 and a plurality of speakers 120. Microphones 110 and speakers 120 may be distributed within the workspace 10. Moreover, a first subset of microphones 110 may be distributed within first zone 12, and a second subset of microphones 110 may be distributed within second zone 14. In the example embodiment shown in FIG. 1, six (6) microphones 110 are distributed within first zone 12, six (6) microphones 110 are distributed within second zone 14, two (2) speakers 120 are distributed within first zone 12, and two (2) speakers 120 are distributed within second zone 14. It will be understood that the arrangement and number of microphones 110 and speakers 120 in first and second zones 12, 14 shown in FIG. 1 is provided by way of example only and that the present subject matter may be used in or with other suitable arrangement and number of microphones 110 and speakers 120 in first and second zones 12, 14 in alternative example embodiments. In example embodiments, the perimeter of first and second zones 12, 14 may be defined by connecting lines between the outermost of microphones 110 in first and second zones 12, 14, e.g., as shown in FIG. 1.

Microphones 110 within first zone 12 may be distributed and configured to collect ambient sound at first zone 12, and transmit data corresponding to the ambient sound at first zone 12. Moreover, microphones 110 within first zone 12 may be configured to output a signal or voltage corresponding to the ambient sound at first zone 12. Speakers 120 within first zone 12 may be distributed and configured to output noise to first zone 12. For example, as discussed in greater detail below, a composite sound may be emitted by speakers 120 within first zone 12 to assist with adaptive additive sound, e.g., in order to reduce or mask the ambient noise within first zone 12.

Microphones 110 within second zone 14 may be distributed and configured to collect ambient sound at second zone 14, and transmit data corresponding to the ambient sound at second zone 14. Moreover, microphones 110 within second zone 14 may be configured to output a signal or voltage corresponding to the ambient sound at second zone 14.

Speakers 120 within second zone 14 may be distributed and configured to output noise to second zone 14. For example, as discussed in greater detail below, a composite sound may be emitted by speakers 120 within second zone 14 to assist with adaptive additive sound, e.g., in order to reduce or mask the ambient noise within second zone 14.

With reference to FIG. 1, operation of system 100 may be regulated by a controller 130 that is operatively coupled to various other components, as will be described below. Generally, controller 130 may operate various components of system 100. Controller 130 may include a memory and one or more microprocessors, CPUs or the like, such as general or special purpose microprocessors operable to execute programming instructions or micro-control code associated with operation of system 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 130 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

In certain example embodiments, controller 130 may include one or more audio amplifiers (e.g., a four-channel amplifier), e.g., with each speaker 120 powered by a channel of the audio amplifier(s) of controller 130. Controller 130 may also include one or more preamplifiers for microphones 110, e.g., with each microphone 110 associated with a respective channel of the microphone preamplifier(s) of controller 130. Controller 130 may further include one or more digital signal processors (DSPs). Controller 130 may also include one or more computing devices, such as a desktop or laptop computer for various signal processing or analysis tasks.

Controller 130 may be positioned in a variety of locations throughout workspace 10, such as within a utility closet. In alternative example embodiments, controller 130 (or portions of controller 130) may be located remote from workspace 10, such as within a basement, another building, etc. Input/output ("I/O") signals may be routed between controller 130 and various operational components of system 100. For example, microphones 110 and speakers 120 may be in communication with controller 130 via one or more signal lines, shared communication busses, or wirelessly.

Controller 130 may also be configured for communicating with one or more remove devices 140, such as computers or servers, via a network. In general, controller 130 may be configured for permitting interaction, data transfer, and other communications between system 100 and one or more external devices 140. For example, this communication may be used to provide and receive operating parameters, user instructions or notifications, performance characteristics, user preferences, or any other suitable information for improved performance of system 100. In addition, it should be appreciated that controller 130 may transfer data or other information to improve performance of one or more external devices 140 and/or improve user interaction with such devices 140.

In example embodiments, remote device 140 may be a remote server in communication with system 100 through a network. In this regard, for example, the remote server 140 may be a cloud-based server, and is thus located at a distant location, such as in a separate city, state, country, etc. According to an exemplary embodiment, controller 130 may communicate with the remote server 140 over the network, such as the Internet, to transmit/receive data or information, provide user information, receive notifications or instructions, interact with or control system 100, etc.

In general, communication between controller 130, external device 140, and/or other devices may be carried using any type of wired or wireless connection and using any suitable type of communication network, non-limiting examples of which are provided below. For example, external device 140 may be in direct or indirect communication with system 100 through any suitable wired or wireless communication connections or interfaces, such as a network. For example, the network may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

Figure 2:
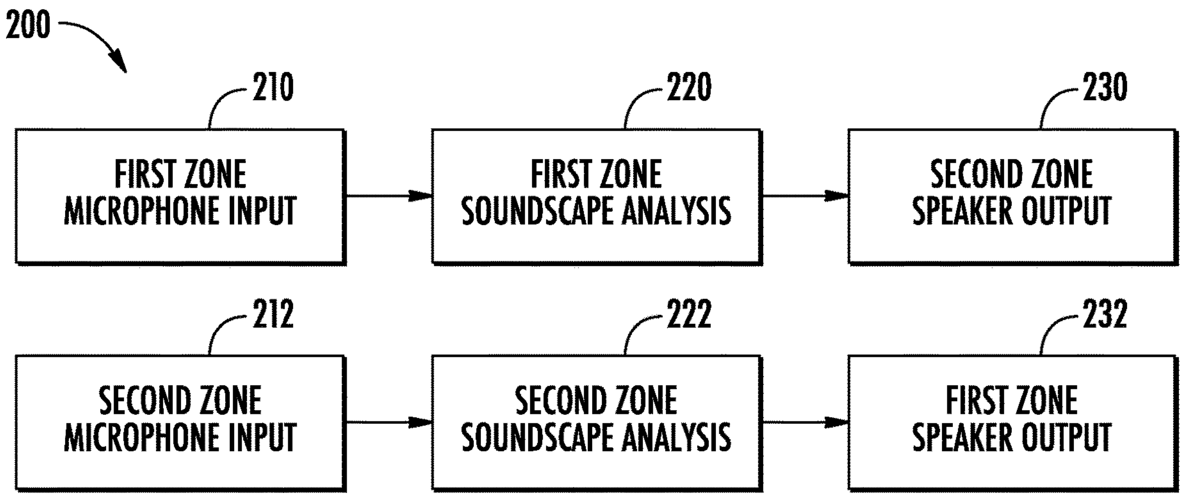
FIG. 2 is a flow chart for certain portions of a method for adaptive additive sound according to an example embodiment of the present subject matter.
Figure 3:
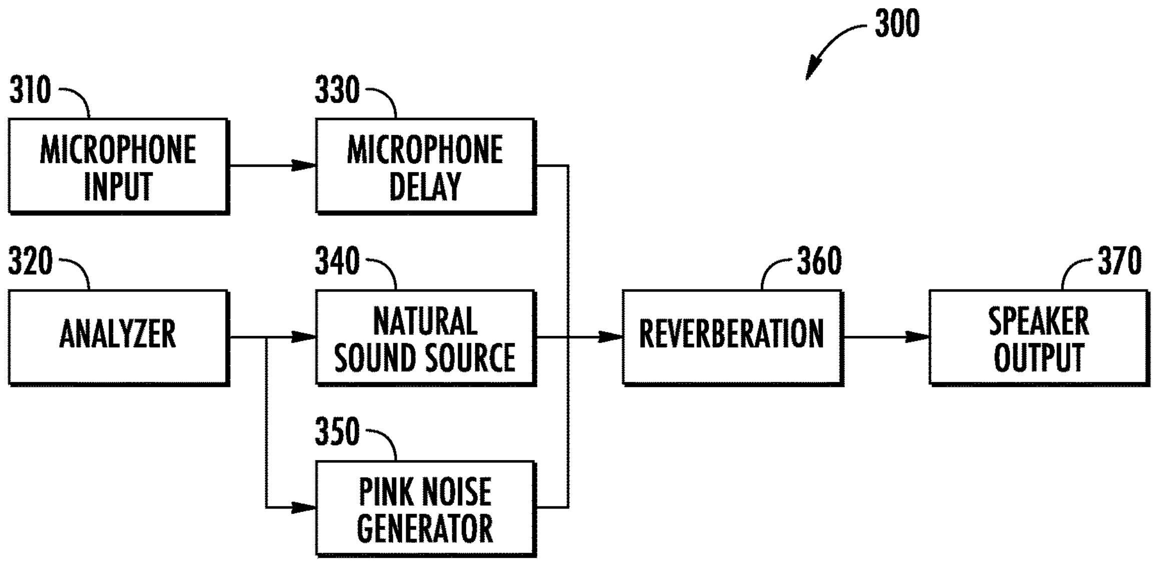
FIG. 3 is a flow chart for certain portions of a method for adaptive additive sound according to an example embodiment of the present subject matter.

Turning now to FIG. 2 through 4, various example aspects of methods 200, 300 for adaptive additive sound will be described. Methods 200, 300 will be described in greater detail below in the context of system 100 (FIG. 1). However, it will be understood that methods 200, 300 may be used in or with other suitable systems in alternative example embodiments. Controller 130 may be programmed or configured to implement methods 200, 300. In certain example embodiments, external device 140 may be programmed or configured to implement portions of methods 200, 300. Methods 200, 300 may assist with dynamically adjusting additive zone sound levels, e.g., based on current ambient noise in the zones.

As shown in FIG. 2, at 210, ambient sound data corresponding to ambient sound in first zone 12 may be acquired by microphones 110 in first zone 12. Thus, e.g., microphones 110 in first zone 12 may record and output the ambient sound data corresponding to ambient sound in first zone 12 to controller 130 at 210. At 212, ambient sound data corresponding to ambient sound in second zone 14 may be acquired by microphones 110 in second zone 14. Thus, e.g., microphones 110 in second zone 14 may record and output the ambient sound data corresponding to ambient sound in second zone 14 to controller 130 at 212. As shown from the above, separate microphones 110 within workspace 10 may record and output ambient sound data corresponding to ambient sound in respective zones of the workspace 10. It will be understood that method 200 may also include similar steps for the other microphones 110 in other zones of workspace 10.

At 220, the ambient sound data corresponding to ambient sound in first zone 12 from 210 may be analyzed. Similarly, at 222, the ambient sound data corresponding to ambient sound in second zone 14 from 212 may be analyzed. It will be understood that method 200 may also include similar steps for analyzing ambient sound data from microphones 110 in other zones of workspace 10. The analysis performed at 220, 222 will be described in greater detail below in the context of method 300 in FIG. 3. In general, audio signal data for the second zone 14 may be generated based at least in part on the ambient sound data corresponding to ambient sound in second zone 14 from 210, and audio signal data for the first zone 12 may be generated based at least in part on the ambient sound data corresponding to ambient sound in first zone 12 from 210. Thus, e.g., ambient sound data from another (e.g., adjacent) zone may be used to generate composite sound for a target zone in order to adjust the ambient or background noise in the target zone.

At 230, the audio signal data for the first zone 12 may be transmitted to and played on speakers 120 in the first zone 12. Similarly, at 232, the audio signal data for the second zone 14 may be transmitted to and played on speakers 120 in the second zone 14. Thus, e.g., speakers 120 within zones in workspace 10 may play respective composite sounds to assist with adjusting the ambient or background noise in the zones of workspace 10. The composite sounds may advantageously mask distractions and thereby increase productivity within workspace 10.

Turning now to FIG. 3, method 300 may assist with analysis of ambient sound data and generation of composite sound data. Method 300 will be described in greater detail below in the context of recordings from microphones 110 in first zone 12 used to generate audio signal data for speakers 120 in the second zone 14. However, it will be understood that method 300 may also be used with recordings from microphones 110 in second zone 14 to generate audio signal data for speakers 120 in the first zone 12. Moreover, method 300 may also be used with other microphones 110 within workspace 10 to generate audio signal data for speakers 120 that are positioned remote relative to the associated microphones 110, i.e., in other zones. Additional description regarding the application of method 300 for other zones of workspace 10 is omitted for the sake of brevity; however, method 300 may be used in the same or similar manner as that described below for such other zones.

At 310, ambient sound data corresponding to ambient sound in first zone 12 may be acquired by microphones 110 in first zone 12. Thus, e.g., microphones 110 in first zone 12 may record and output the ambient sound data corresponding to ambient sound in first zone 12 at 310. As an example, controller 130 may receive analog signals from microphones 110 in first zone 12 at 310, and controller 130 may include an analog-to-digital converter for converting the analog signals from microphones 110 in first zone 12 to digital signals. The ambient sound data at 310 may include sounds from various sources in the first zone 12, such as people in the first zone 12 (e.g., talking, moving, typing, etc.), HVAC noise, and other background noises. The first zone 12 may be selected for various parameters that provide suitable background noise, such as ceiling height, ceiling type, floor type, space finishes, number of workers, type of workers, number of adjacent doors, types of adjacent spaces (such as kitchens, reception areas, etc.), and other factors. In certain example embodiments, the first zone 12 may be selected such that an average background noise in first zone is about forty decibels (40 dB).

At 320, the ambient sound data from 310 may be analyzed. For instance, the ambient sound data from 310 may be analyzed in order to determine a spectral balance of the ambient sound of the first zone 12 in a plurality of octave bands. It will be understood that the term "octave band" is used broadly herein to describe a frequency band. In example embodiments, each octave band may span one octave or a fraction of an octave. At 320, the level or intensity of the ambient sound of the first zone 12 from 310 may be determined for each octave in the octave band at 320. Thus, method 300 may include calculating a spectral balance and overall level of incoming microphone signals at 320. As a particular example, at 320, method 300 may filter the ambient sound data from 310 by octave band and average the level or intensity in each octave band over a rolling window, such as about one second.

At 320, the ambient sound data from 310 may also be compared to target values. For instance, the spectral balance of the ambient sound of the first zone 12 in each of the plurality of octave bands may be compared to respective target values. Moreover, differences between the target values and the spectral balance of the ambient sound of the first zone 12 in the plurality of octave bands may be calculated. An overall sound level for the second zone 14 may thus be offset depending on the noise level in the first zone 12 and may also be bounded by workspace minimum/maximum levels, such as between about forty-one decibels (41 dB) and about forty-nine decibels (49 dB), which may correspond to minimum and maximum background noise requirements for the workspace 10.

At 330, a delay may be applied to the ambient sound data from 310. Thus, e.g., a delay effect may be added to the ambient sound data acquired by the microphones 110 in first zone 12. For instance, the delay may be configured as a studio delay, such that the ambient sound data from 310 is reintroduced at diminishing levels or intensity until the ambient sound data is reduced to nothing or zero. The duration of the delay may be varied, such as no less than five seconds (5 s) and no greater than fifteen seconds (15 s). As described in greater detail below, the delayed ambient sound data for the first zone 12 generated at 330 may be used as part of a composite sound for the second zone 14. Utilizing the delayed ambient sound data for the first zone 12 from 330 (e.g., rather than undelayed ambient sound data from 310) as part of the composite sound for the second zone 14 may limit or prevent a listener in the second zone 14 from simultaneously or closely hearing both the actual ambient noise from the first zone 12 and the reproduced ambient noise from the first zone 12 over speakers 120 in the second zone 14 as part of the composite sound.

At 340, natural noise data corresponding to natural sounds may be generated. As an example, controller 130 may generate or retrieve an audio file of a natural sound at 340. The natural noise data may include a suitable one or more natural noise sounds, such as e.g., a waterfall sound, a stream sound, a wind sound, a wave sound, movement of another fluid in nature, and/or other natural sounds. As described in greater detail below, the natural noise data generated at 340 may be used as part of the composite sound for the second zone 14. The natural noise data may advantageously provide acoustically interesting sounds for the composite sound at the second zone 14.

At 350, pink noise data for the second zone 14 corresponding to pink noise may be generated. In general, the term "pink noise" may refer to a signal with a frequency spectrum having a power spectral density that is inversely proportional to the frequency of the signal. Thus, each octave interval may carry an equal amount of noise energy in the pink noise. As an example, the pink noise data for the second zone 14 may be generated at 350 such that a spectral balance of the pink noise in the plurality of octave bands is correlated (e.g., matched) to the spectral balance of the ambient sound of the first zone 12 in the plurality of octave bands. For instance, uncorrelated pink noise data may be generated, and the uncorrelated pink noise data may be filtered such that the spectral balance of the pink noise in the plurality of octave bands is correlated (e.g., matched) to the spectral balance of the ambient sound of the first zone 12 from 310, e.g., as determined at 320 during the analysis of the ambient sound data from 310. Thus, the pink noise data for the second zone 14 may be advantageously correlated or matched to the ambient sound of the first zone 12 to assist with provide acoustically matched sounds for the composite sound at the second zone 14. The pink noise data may advantageously provide a masking noise for the composite sound at the second zone 14.

At 360, audio signal data for the second zone 14 may be generated. For example, the audio signal data for the second zone 14 may be generated based at least in part on the delayed ambient sound data for the first zone 12 from 330, the natural noise data generated at 340, and the pink noise data for the second zone 14 generated at 350. As a particular example, at 360, the delayed ambient sound data for the first zone 12 from 330, the natural noise data generated at 340, and the pink noise data for the second zone 14 generated at 350 may all be convolved to generate the ambient sound data for the second zone 14 at 360. The convolving may include applying reverberation to the composite sound data from the delayed ambient sound data for the first zone 12 from 330, the natural noise data generated at 340, and the pink noise data for the second zone 14 generated at 350. The reverberation may advantageously provide a "washy" sound.

In example embodiment, the audio signal data for the second zone 14 may be generated such that the audio signal data for the second zone 14 is less than and/or optimized for acceptable workplace noise levels, such as between about forty-one decibels (41 dB) and about forty-nine decibels (49 dB). Thus, e.g., the audio signal data for the second zone 14 may be limited despite increasing noise within first zone 12. Moreover, if ambient sound in the first zone 12 exceeds the acceptable workplace noise levels, method 300 may limit the audio signal data for the second zone 14 to avoid generating unacceptable noise in the second zone 14.

At 370, the audio signal data for the second zone 14 from 360 may be transmitted to speakers 120 in the second zone 14. Moreover, the audio signal data for the second zone 14 from 360 may be played on the speakers 120 in the second zone 14. The composite sound data that includes the delayed ambient sound data for the first zone 12 from 330, the natural noise data generated at 340, and the pink noise data for the second zone 14 generated at 350 may advantageously provide background noise for the second zone 14 that is both lively for encouraging collaboration and steady state for masking.

As may be seen from the above, the present subject matter may advantageously provide dynamic, adaptive soundscaping for an open office area. For example, when workspace 10 is laid out for a mix of focus work and video calls, system 100 may create a sonic environment that masks distracting chatter without contributing to distraction. To mask speech, the composite sound may include the pink noise for speech frequency spectrum masking. To mask speech and unwanted noise, the delayed ambient noise from another zone may overcome the irrelevant speech effect, which frequently reduces the efficacy of conventional sound masking. To mask unwanted noise, the natural sound may also provide additional masking and/or engender biophilic affinity. Thus, the adaptive acoustics system may dynamically adjust additive zone sound levels based on the amount of current ambient noise in a space. Moreover, the system may capture ambient sound from another space, analyzes the sound level against acoustic guidelines, and then inject a composite sound to assist with limiting acoustic distractions in the target space. The composite sound may adjust the ambient noise to be both lively enough to maintain speech privacy and steady state enough to decrease conversational distractions.

FIGS. 2 and 3 depict steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure. Moreover, although aspects of methods 200, 300 are explained using system 100 as an example, it should be appreciated that these methods may be applied to the operation of any suitable system.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

EXAMPLE EMBODIMENTS

First example embodiment: A method for adaptive additive sound, comprising: receiving ambient sound data corresponding to ambient sound in a first zone acquired by a microphone in the first zone; analyzing the ambient sound data from the first zone; generating audio signal data for the second zone based at least in part on the ambient sound data from the first zone; and transmitting the audio signal data for the second zone to a speaker in the second zone, wherein the first zone is separate from the second zone within a space.

Second example embodiment: The method of the first example embodiment, wherein receiving the ambient sound data corresponding to the ambient sound in the first zone comprises receiving the ambient sound data corresponding to the ambient sound in the first zone acquired by a plurality of microphones in the first zone.

Third example embodiment: The method of either the first example embodiment or the second example embodiment, wherein: analyzing the ambient sound data from the first zone comprises analyzing the ambient sound data from the first zone in order to determine a spectral balance of the ambient sound of the first zone in a plurality of octave bands; the method further comprises generating pink noise data for the second zone corresponding to pink noise such that a spectral balance of the pink noise in the plurality of octave bands is correlated to the spectral balance of the ambient sound of the first zone in the plurality of octave bands; and the audio signal data for the second zone comprises delayed ambient sound data from the first zone, the pink noise data for the second zone, and natural noise data corresponding to natural sounds.

Fourth example embodiment: The method of the third example embodiment, wherein analyzing the ambient sound data from the first zone comprises analyzing the ambient sound data from the first zone in order to determine the respective spectral balance of the ambient sound from the first zone in the plurality of octave bands for each of a plurality of microphones in the first zone.

Fifth example embodiment: The method of either of the third example embodiment or the fourth example embodiment, wherein generating the pink noise data for the second zone comprises generating the pink noise data for the second zone such that the spectral balance of the pink noise in the plurality of octave bands is correlated to the spectral balance of the ambient sound in the plurality of octave bands for each of the plurality of microphones in the first zone.

Sixth example embodiment: The method of any one of the third through fifth example embodiments, wherein analyzing the ambient sound data from the first zone comprises averaging a level of the ambient sound data from the first zone over an interval.

Seventh example embodiment: The method of any one of the third through sixth example embodiments, wherein generating the pink noise data for the second zone comprises generating the pink noise data for the second zone such that a level of the pink noise in each of the plurality of octave bands over the interval is correlated to the level of the ambient sound in each of the plurality of octave bands over the interval.

Eighth example embodiment: The method of any one of the third through seventh example embodiments, wherein the natural noise data comprises one or more of a waterfall sound, a stream sound, a wind sound, and a wave sound.

Ninth example embodiment: The method of any one of the third through eight example embodiments, further comprising generating the audio signal data for the second zone by convolving the delayed ambient sound data from the first zone, the pink noise data for the second zone, and the natural noise data.

Tenth example embodiment: The method of any one of the third through ninth example embodiments, wherein convolving the delayed ambient sound data from the first zone, the pink noise data for the second zone, and the natural noise data comprises applying reverberation.

Eleventh example embodiment: The method of any one of the first through tenth example embodiments, further comprising playing the audio signal data for the second zone on the speaker in the second zone in order to adjust the ambient sound in the second zone.

Twelfth example embodiment: The method of any one of the first through eleventh example embodiments, wherein: the first zone is disposed at a first plurality of desks; the second zone is disposed at a second plurality of desks; and the first plurality of desks is spaced from the second plurality of desks.

Thirteenth example embodiment: A system for adaptive additive sound, comprising: a first plurality of microphones distributed within a first zone; a first speaker positioned within the first zone; a second plurality of microphones distributed within a second zone that is spaced from the first zone; a second speaker positioned within the second zone; one or more processors; and one or more non-transitory computer-readable media that store instructions that, when executed by the one or more processors, cause the computing system to perform operations, the operations comprising receiving ambient sound data corresponding to ambient sound in the first zone from the first plurality of microphones, analyzing the ambient sound data from the first zone, generating audio signal data for the second zone based at least in part on the ambient sound data from the first zone, and transmitting the audio signal data for the second zone to the second speaker.

Fourteenth example embodiment: The system of the thirteenth example embodiment, wherein: analyzing the ambient sound data from the first zone comprises analyzing the ambient sound data from the first zone in order to determine a spectral balance of the ambient sound of the first zone in a plurality of octave bands; the method further comprises generating pink noise data for the second zone corresponding to pink noise such that a spectral balance of the pink noise in the plurality of octave bands is correlated to the spectral balance of the ambient sound of the first zone in the plurality of octave bands; and the audio signal data for the second zone comprises delayed ambient sound data from the first zone, the pink noise data for the second zone, and natural noise data corresponding to natural sounds.

Fifteenth example embodiment: The system of the fourteenth example embodiment, wherein analyzing the ambient sound data from the first zone comprises averaging a level of the ambient sound data from the first zone over an interval.

Sixteenth example embodiment: The system of either of the fourteenth example embodiment or the fifteenth example embodiment, wherein generating the pink noise data for the second zone comprises generating the pink noise data for the second zone such that a level of the pink noise in each of the plurality of octave bands over the interval is correlated to the level of the ambient sound in each of the plurality of octave bands over the interval.

Seventeenth example embodiment: The system of any one of the fourteenth through sixteenth example embodiments, wherein the natural noise data comprises one or more of a waterfall sound, a stream sound, a wind sound, and a wave sound.

Eighteenth example embodiment: The system of any one of the fourteenth through seventeenth example embodiments, wherein the operations further comprise generating the audio signal data for the second zone by convolving the delayed ambient sound data from the first zone, the pink noise data for the second zone, and the natural noise data.

Nineteenth example embodiment: The system of any one of the fourteenth through eighteenth example embodiments, wherein convolving the delayed ambient sound data for the second zone, the pink noise data for the second zone, and the natural noise data comprises applying reverberation.

Twentieth example embodiment: The system of any one of the thirteenth through eighteenth example embodiments, wherein the operations further comprise playing the audio signal data for the second zone on the speaker in the second zone in order to adjust the ambient sound in the second zone.

What is claimed is:

1. A method for adaptive additive sound, comprising:

receiving ambient sound data corresponding to ambient sound in a first zone acquired by a microphone in the first zone;

analyzing the ambient sound data from the first zone in order to determine a spectral balance of the ambient sound of the first zone in a plurality of octave bands;

generating pink noise data for a second zone corresponding to pink noise such that a spectral balance of the pink noise in the plurality of octave bands is correlated to the spectral balance of the ambient sound of the first zone in the plurality of octave bands;

generating audio signal data for the second zone based at least in part on the ambient sound data from the first zone, the audio signal data for the second zone comprising delayed ambient sound data from the first zone, the pink noise data for the second zone, and natural noise data corresponding to natural sounds; and transmitting the audio signal data for the second zone to a speaker in the second zone, wherein the first zone is separate from the second zone within a space.

2. The method of claim 1, wherein receiving the ambient sound data corresponding to the ambient sound in the first zone comprises receiving the ambient sound data corresponding to the ambient sound in the first zone acquired by a plurality of microphones in the first zone.

3. The method of claim 1, wherein analyzing the ambient sound data from the first zone comprises analyzing the ambient sound data from the first zone in order to determine the respective spectral balance of the ambient sound from the first zone in the plurality of octave bands for each of a plurality of microphones in the first zone.

4. The method of claim 3, wherein generating the pink noise data for the second zone comprises generating the pink noise data for the second zone such that the spectral balance of the pink noise in the plurality of octave bands is correlated to the spectral balance of the ambient sound in the plurality of octave bands for each of the plurality of microphones in the first zone.

5. The method of claim 1, wherein analyzing the ambient sound data from the first zone comprises averaging a level of the ambient sound data from the first zone over an interval.

6. The method of claim 5, wherein generating the pink noise data for the second zone comprises generating the pink noise data for the second zone such that a level of the pink noise in each of the plurality of octave bands over the interval is correlated to the level of the ambient sound in each of the plurality of octave bands over the interval.

7. The method of claim 1, wherein the natural noise data comprises one or more of a waterfall sound, a stream sound, a wind sound, and a wave sound.

8. The method of claim 1, further comprising generating the audio signal data for the second zone by convolving the delayed ambient sound data from the first zone, the pink noise data for the second zone, and the natural noise data.

9. The method of claim 8, wherein convolving the delayed ambient sound data from the first zone, the pink noise data for the second zone, and the natural noise data comprises applying reverberation.

10. The method of claim 1, further comprising playing the audio signal data for the second zone on the speaker in the second zone in order to adjust the ambient sound in the second zone.

11. The method of claim 1, wherein:

the first zone is disposed at a first plurality of desks;

the second zone is disposed at a second plurality of desks; and the first plurality of desks is spaced from the second plurality of desks.

12. A system for adaptive additive sound, comprising:

a first plurality of microphones distributed within a first zone;

a first speaker positioned within the first zone;

a second plurality of microphones distributed within a second zone that is spaced from the first zone;

a second speaker positioned within the second zone;

one or more processors; and one or more non-transitory computer-readable media that store instructions that, when executed by the one or more processors, cause the system to perform operations, the operations comprising receiving ambient sound data corresponding to ambient sound in the first zone from the first plurality of microphones, analyzing the ambient sound data from the first zone in order to determine a spectral balance of the ambient sound of the first zone in a plurality of octave bands, generating pink noise data for the second zone corresponding to pink noise such that a spectral balance of the pink noise in the plurality of octave bands is correlated to the spectral balance of the ambient sound of the first zone in the plurality of octave bands, generating audio signal data for the second zone based at least in part on the ambient sound data from the first zone, the audio signal data for the second zone comprising delayed ambient sound data from the first zone, the pink noise data for the second zone, and natural noise data corresponding to natural sounds, and transmitting the audio signal data for the second zone to the second speaker.

13. The system of claim 12, wherein analyzing the ambient sound data from the first zone comprises averaging a level of the ambient sound data from the first zone over an interval.

14. The system of claim 13, wherein generating the pink noise data for the second zone comprises generating the pink noise data for the second zone such that a level of the pink noise in each of the plurality of octave bands over the interval is correlated to the level of the ambient sound in each of the plurality of octave bands over the interval.

15. The system of claim 12, wherein the natural noise data comprises one or more of a waterfall sound, a stream sound, a wind sound, and a wave sound.

16. The system of claim 12, wherein the operations further comprise generating the audio signal data for the second zone by convolving the delayed ambient sound data from the first zone, the pink noise data for the second zone, and the natural noise data.

17. The system of claim 16, wherein convolving the delayed ambient sound data for the second zone, the pink noise data for the second zone, and the natural noise data comprises applying reverberation.

18. The system of claim 12, wherein the operations further comprise playing the audio signal data for the second zone on the speaker in the second zone in order to adjust the ambient sound in the second zone.

* * * * *